(12) United States Patent
Lekatsas et al.

(10) Patent No.: US 8,531,131 B2
(45) Date of Patent: Sep. 10, 2013

(54) AUTO-SENSING SWITCHING REGULATOR TO DRIVE A LIGHT SOURCE THROUGH A CURRENT REGULATOR

(75) Inventors: Nicholas Lekatsas, Andover, MA (US); Biju Antony, Lynnfield, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 404 days.

(21) Appl. No.: 12/888,124

(22) Filed: Sep. 22, 2010

(65) Prior Publication Data
US 2012/0068626 A1    Mar. 22, 2012

(51) Int. Cl.
*G05F 1/00* (2006.01)
(52) U.S. Cl.
USPC ........................................................ 315/307
(58) Field of Classification Search
USPC ................. 315/291, 307, 224, 293, 294, 297, 315/298, 299, 300, 301, 302, 306
See application file for complete search history.

(56) References Cited

U.S. PATENT DOCUMENTS

| | | | |
|---|---|---|---|
| 7,402,961 B2 * | 7/2008 | Bayat et al. | 315/295 |
| 7,583,035 B2 | 9/2009 | Shteynberg et al. | |
| 7,683,553 B2 * | 3/2010 | Fong | 315/185 R |
| 7,692,912 B2 * | 4/2010 | Fiebrich et al. | 361/93.9 |
| 2005/0180139 A1 * | 8/2005 | Takeda et al. | 362/276 |
| 2007/0132407 A1 * | 6/2007 | Namba et al. | 315/312 |
| 2007/0146051 A1 * | 6/2007 | Tsen | 327/536 |
| 2009/0187925 A1 * | 7/2009 | Hu et al. | 719/327 |
| 2009/0261748 A1 | 10/2009 | McKinney et al. | |
| 2009/0273290 A1 * | 11/2009 | Ziegenfuss | 315/193 |
| 2010/0020108 A1 | 1/2010 | Cho et al. | |
| 2010/0156315 A1 | 6/2010 | Zhao et al. | |

FOREIGN PATENT DOCUMENTS

KR    10-2006-0081902 A    7/2006

OTHER PUBLICATIONS

Chang Rag Choi, International Search Report and Written Opinion of the International Searching Authority, Mar. 14, 2012, pp. 1-7, Korean Intellectual Property Office, Daejeon, Republic of Korea.

* cited by examiner

*Primary Examiner* — Minh D A
(74) *Attorney, Agent, or Firm* — Shaun P. Montana

(57) ABSTRACT

An auto-sensing switching regulator, and systems and methods including same, is disclosed. The auto-sensing switching regulator includes a switching regulator and a controller coupled thereto. The controller is configured to provide a control signal to the switching regulator to increase the output voltage while receiving a current sense signal representative of a current output of the switching regulator, and to provide the control signal in response to the current sense signal to set the output voltage at a set value corresponding to a value at which the current output stops increasing with an increase in the output voltage. A system to drive a light source includes a current regulator configured to provide a constant current output to the light source and an auto-sensing switching regulator coupled to the current regulator, and configured to receive an input voltage from a voltage supply and provide an output voltage to the current regulator.

20 Claims, 7 Drawing Sheets

801 MONITOR A CURRENT OUTPUT TO A CURRENT REGULATOR WHILE INCREASING AN OUTPUT VOLTAGE TO THE CURRENT REGULATOR

↓

802 SET THE OUTPUT VOLTAGE AT A SET VALUE CORRESPONDING TO A VALUE AT WHICH THE CURRENT OUTPUT STOPS INCREASING WITH AN INCREASE IN THE OUTPUT VOLTAGE

FIG. 8

901 MONITOR A CURRENT OUTPUT TO A CURRENT REGULATOR WHILE INCREASING AN OUTPUT VOLTAGE TO THE CURRENT REGULATOR

↓

902 SET THE OUTPUT VOLTAGE AT A SET VALUE CORRESPONDING TO A VALUE AT WHICH THE CURRENT OUTPUT STOPS INCREASING WITH AN INCREASE IN THE OUTPUT VOLTAGE

> 905 THE SET VALUE IS THE SAME AS THE VALUE AT WHICH THE CURRENT OUTPUT STOPS INCREASING WITH AN INCREASE IN THE OUTPUT VOLTAGE
>
> 906 THE SET VALUE IS A DIFFERENT VALUE THAN THE VALUE AT WHICH THE CURRENT OUTPUT STOPS INCREASING WITH AN INCREASE IN THE OUTPUT VOLTAGE
>
> 907 THE SET VALUE IS APPROXIMATELY EQUAL TO A FORWARD VOLTAGE DROP FROM AN OUTPUT OF AN AUTO-SENSING SWITCHING REGULATOR THROUGH A LIGHT SOURCE

↓

903 REDUCE THE OUTPUT VOLTAGE FROM THE SET VALUE AND THEN INCREASE THE OUTPUT VOLTAGE WHILE MONITORING THE CURRENT OUTPUT

↓

904 SET THE OUTPUT VOLTAGE AT A SECOND SET VALUE CORRESPONDING TO A SECOND VALUE AT WHICH THE CURRENT OUTPUT STOPS INCREASING WITH AN INCREASE IN THE OUTPUT VOLTAGE

FIG. 9

AUTO-SENSING SWITCHING REGULATOR TO DRIVE A LIGHT SOURCE THROUGH A CURRENT REGULATOR

TECHNICAL FIELD

The present application relates to light source drivers, and more particularly, to an auto-sensing switching regulator.

BACKGROUND

The development of high-brightness solid state light sources, such as but not limited to light emitting diodes (LEDs), has led to use of such devices in various lighting fixtures. In general, an LED is a current driven device, i.e. the brightness of the light output of an LED may be directly related to the current supplied to the LED. However, the current through an LED should be limited to a design maximum to avoid over-current damage or failure of the LED.

To achieve controlled luminance and to prevent over-current failure of an LED or string of series-connected LEDs, it is known to drive the LED(s) through a linear current regulator using a constant voltage source. The constant voltage source may provide a constant output voltage at an input to the linear current regulator. In response to the output of the constant voltage source, the linear current regulator may provide a constant output current to the LED(s). The LED(s) may thus be driven at a constant current, even with changes in the forward voltage drop across the LED(s), e.g. due to environmental conditions, aging, or other variances from a nominal voltage drop.

SUMMARY

Conventional linear regulators may thus offer an inexpensive and convenient means of providing a constant current for driving an LED or a string of series-connected LEDs. However, one drawback associated with conventional linear current regulators is poor efficiency. For example, the constant voltage source may provide an input to the linear current regulator at a voltage that is higher than the forward voltage drop across the LED(s) plus the voltage overhead necessary to operate the linear current regulator. In such circumstances, the excess power provided by the constant voltage source is dissipated in ohmic losses (e.g., in the collector-emitter region of a pass transistor in its active mode), which generates heat. This inefficiency may require higher-rated and consequently more expensive and larger components in the linear regulator, and may also require managing the heat generated by the inefficiency. This may result in increased operating cost.

Embodiments of the present invention provide an auto-sensing switching regulator, coupled between a voltage source and a current regulator, to drive a light source. The auto-sensing switching regulator provides an output voltage that approximates the forward voltage drop through the current regulator and the light source, and may be dynamically adjusted to account for changes or variations in the load. As a result, excess voltage input need not be dissipated in the current regulator to drive the light source at a constant current, even when changes in the load occur. Embodiments may thus provide more efficient power transfer and decrease the conversion of loss compared to a system using only voltage source and a current regulator to drive the light source.

In an embodiment, there is provided a system to drive a light source. The system includes a current regulator configured to provide a constant current output to the light source; and an auto-sensing switching regulator coupled to the current regulator, and configured to receive an input voltage from a voltage supply and provide an output voltage to the current regulator. The auto-sensing switching regulator includes a switching regulator, and a controller coupled to the switching regulator. The controller is configured to provide a control signal to the switching regulator to increase the output voltage while receiving a current sense signal representative of a current output of the switching regulator. The controller is also configured to provide the control signal in response to the current sense signal to set the output voltage at a set value corresponding to a value at which the current output stops increasing with an increase in the output voltage.

In a related embodiment, the controller may be further configured to provide the control signal to reduce the output voltage from the set value and then increase the output voltage while receiving the signal representative of the current output, and the controller may be configured to provide the control signal to set the output voltage at a second set value corresponding to a second value at which the current output stops increasing with an increase in the output voltage.

In another related embodiment, the set value may be the same as the value at which the current output stops increasing with an increase in the output voltage. In yet another related embodiment, the set value may be a different value than the value at which the current output stops increasing with an increase in the output voltage. In still another related embodiment, the set value may be approximately equal to a forward voltage drop from an output of the auto-sensing switching regulator through the light source.

In yet another related embodiment, the controller may be configured to receive a voltage sense signal representative of the voltage output, and the controller may be configured to provide the control signal to set the output voltage at the set value in response to the current sense signal and the voltage sense signal. In a further related embodiment, the controller may be configured to store a value of the voltage sense signal corresponding to a value at which the current sense signal stops increasing with increasing values of the voltage sense signal, and the set value may be a voltage value corresponding to the stored value of the voltage sense signal.

In still yet another related embodiment, the light source may include at least one solid state light source.

In another embodiment, there is provided an auto-sensing switching regulator to receive a voltage input from a voltage supply and to provide an output voltage to a current regulator configured to provide a constant current output to a light source. The auto-sensing switching regulator includes a switching regulator and a controller coupled to the switching regulator. The controller is configured to provide a control signal to the switching regulator to increase the output voltage while receiving a current sense signal representative of a current output of the switching regulator. The controller is also configured to provide the control signal in response to the current sense signal to set the output voltage at a set value corresponding to a value at which the current output stops increasing with an increase in the output voltage.

In a related embodiment, the controller may be further configured to provide the control signal to reduce the output voltage from the set value and then increase the output voltage while receiving the signal representative of the current output, and the controller may also be configured to provide the control signal to set the output voltage at a second set value corresponding to a second value at which the current output stops increasing with an increase in the output voltage.

In another related embodiment, the set value may be the same as the value at which the current output stops increasing with an increase in the output voltage. In yet another related embodiment, the set value may be a different value than the value at which the current output stops increasing with an increase in the output voltage. In still another related embodiment, the set value may be approximately equal to a forward voltage drop from an output of the auto-sensing switching regulator through the light source.

In yet still another related embodiment, the controller may be configured to receive a voltage sense signal representative of the voltage output, and the controller may be configured to provide the control signal to set the output voltage at the set value in response to the current sense signal and the voltage sense signal. In a further related embodiment, the controller may be configured to store a value of the voltage sense signal corresponding to a value at which the current sense signal stops increasing with increasing values of the voltage sense signal, and the set value may be a voltage value corresponding to the stored value of the voltage sense signal.

In another embodiment, there is provided a method of improving efficiency of a system including a current regulator to drive a light source. The method includes monitoring a current output to the current regulator while increasing an output voltage to the current regulator, and setting the output voltage at a set value corresponding to a value at which the current output stops increasing with an increase in the output voltage.

In a related embodiment, the method may further include reducing the output voltage from the set value and then increasing the output voltage while monitoring the current output, and setting the output voltage at a second set value corresponding to a second value at which the current output stops increasing with an increase in the output voltage.

In another related embodiment, the set value may be the same as the value at which the current output stops increasing with an increase in the output voltage. In still another related embodiment, the set value may be a different value than the value at which the current output stops increasing with an increase in the output voltage.

In yet another related embodiment, the set value may be approximately equal to a forward voltage drop from an output of the auto-sensing switching regulator through the light source.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 8-9 show flowcharts of methods according to embodiments described herein.

DETAILED DESCRIPTION

In general, a system according to embodiments described herein includes an auto-sensing switching regulator, coupled between a voltage source and a current regulator, to drive a light source, and/or in some embodiments, one or more lights sources. The auto-sensing switching regulator receives a voltage input from the voltage source and provides a voltage output to the current regulator. The voltage output approximates the forward voltage drop from the output of the auto-sensing switching regulator and through the current regulator and the light source. The auto-sensing switching regulator dynamically adjusts the voltage output to account for changes or variations in the load presented by the light source(s) and/or the current regulator. As a result, the current regulator may receive a reduced voltage input compared a system without an auto-sensing switching regulator according to embodiments described herein so that excess voltage input need not be dissipated in the current regulator to drive the light source at a constant current. This remains true even when aging, temperature, environmental conditions, etc. cause changes in the load presented to the auto-sensing switching regulator by the light source and/or the current regulator. Thus, embodiments may provide more efficient power transfer and decrease the conversion of loss compared to a system using only a voltage source and a current regulator to drive a light source.

Figure 1:
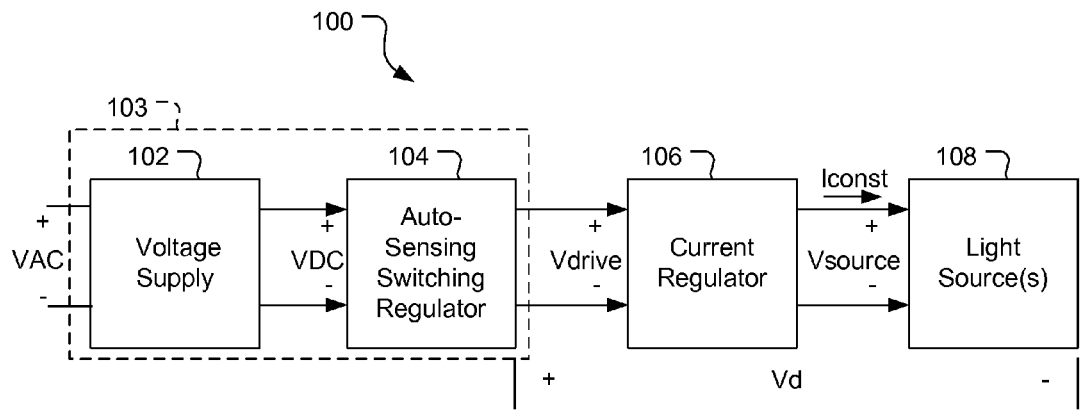
FIG. 1 is a block diagram of a system according to embodiments described herein.

FIG. 1 shows a system 100 to drive a light source 108 according to embodiments described herein. In general, the system 100 includes a voltage supply 102, an auto-sensing switching regulator 104, a current regulator 106, and a light source 108. The voltage supply 102 provides a direct current (DC) voltage output VDC. The auto-sensing switching regulator 104 is coupled to the voltage supply 102 to receive the DC voltage output VDC and to provide a drive voltage Vdrive to the current regulator 106. The drive voltage Vdrive provided by the auto-sensing switching regulator 104 may be different from the DC output voltage VDC of the voltage supply 102, but may approximate a voltage drop Vd from an output of the auto-sensing switching regulator 104 through the light source 108 (e.g., across the current regulator 106 and the light source 108). The current regulator 106 is coupled to the light source 108 and provides an output voltage Vsource configured to provide a constant current Iconst to drive the light source 108.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

The voltage supply 102 may be a known voltage supply configured to provide the DC output voltage VDC sufficient to drive the light source 108. The voltage supply 102 may be configured to receive an alternating current (AC) input VAC, as shown in FIG. 1, and perform AC-DC conversion in a known manner to provide the DC voltage output VDC as a regulated constant voltage. The voltage supply may also be configured as a simple rectifier circuit, e.g. a bridge rectifier that provides full-wave rectification of an AC input and provides an unregulated rectified AC output voltage. In some embodiment, the VAC input to the voltage supply 102 may be provided directly from a 120 VAC/60 Hz line source. It is to be understood, however, that a system 100 according to embodiments described herein may operate from other AC sources, such as but not limited to a 220-240 VAC at 50-60 Hz. Alternatively, the voltage supply 102 may be configured to receive a battery input and perform DC-DC conversion in a known manner to provide a regulated constant DC voltage as output, or the voltage supply 102 itself may be a battery that directly provides the DC voltage output VDC.

The current regulator 106 may take a known configuration to provide a constant current output Iconst to the light source 108 in response to a voltage input, e.g. the drive voltage Vdrive in FIG. 1. In some embodiments, the current regulator 106 may be a known linear current regulator that dissipates excess voltage at its input in ohmic losses, thereby generating heat. A variety of discrete and solid state linear current regulators that provide a constant current output to a load in response to a voltage input are well-known. For example, a linear current regulator may be provided using feedback in a known linear voltage regulator configuration to establish a constant current output. Solid state linear current regulators are commercially available from a variety of sources. One example of a solid state linear current regulator is a model number NSI45020T1G linear current regulator presently available from Semiconductor Components Industries, LLC of Denver, Colo.

The light source 108 may be any light source that may be driven by the constant current output Iconst, i.e. from the current regulator 106, to provide a light output. In some embodiments, the light source 108 may be a solid state-based light source, such as but not limited to an LED-based light source including a single LED or multiple LEDs connected in series. The light source 108 may also be configured as a plurality of series connected strings of solid state light sources, such as but not limited to LEDs, coupled in parallel with each other.

Figure 2:
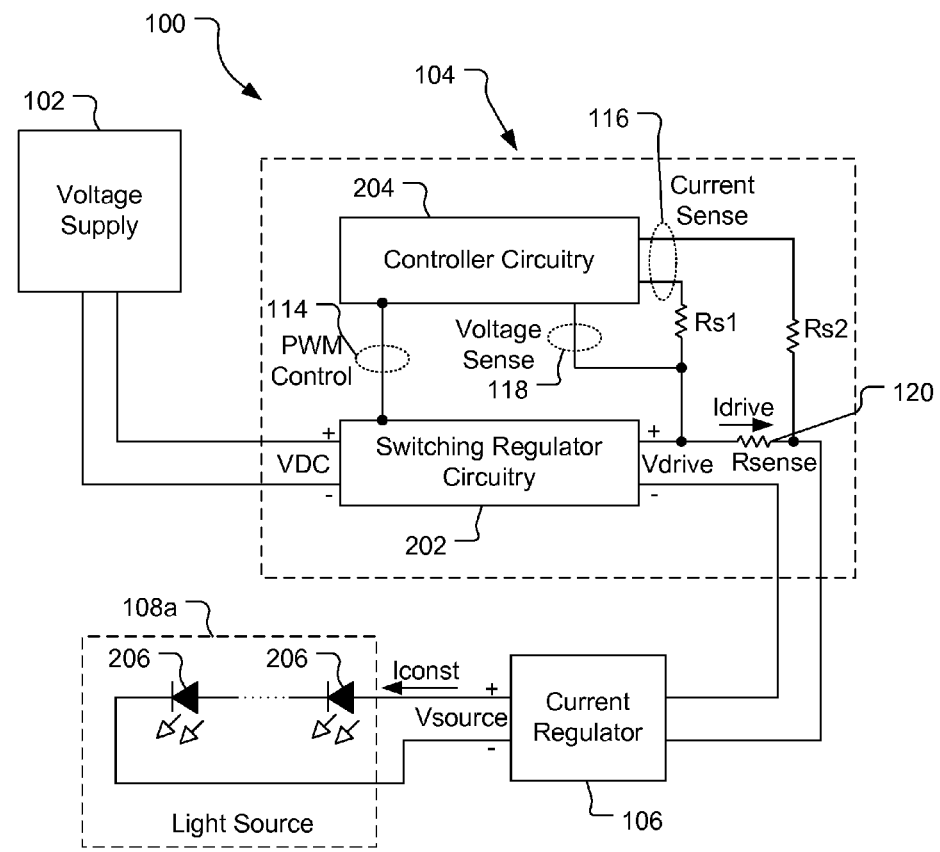
FIG. 2 is a block diagram illustrating performance of an auto-sensing switching regulator in a system according to embodiments described herein.

FIG. 2 is a block diagram that conceptually illustrates the functionality of an auto-sensing switching regulator 104 within a system 100 according to embodiments described herein. As shown, the auto-sensing switching regulator 104 may include switching regulator circuitry 202 and controller circuitry 204 coupled to the switching regulator circuitry 202. The auto-sensing switching regulator 104 is coupled between the voltage supply 102 and the current regulator 106 to provide the drive voltage Vdrive to the current regulator 106. The current regulator 106 provides constant current output Iconst to the light source 108, which in FIG. 2 is shown as a plurality of series-connected LEDs 206.

The switching regulator circuitry 202 may include a known switching regulator configuration configured to convert one DC voltage level to another by storing the input energy temporarily and then releasing that energy under the control of a switch to the output, e.g. the current regulator 106, at a different voltage. The storage may be in either magnetic field storage components (inductors, transformers) or electric field storage components (capacitors). This conversion method is more power-efficient (often 75% to 98%) than linear voltage regulation, which dissipates unused power as heat.

Depending on the DC voltage output VDC of the voltage supply 102 and the drive voltage Vdrive required to drive the current regulator 106, the switching regulator circuitry 202 may include a known switching regulator such as a known step-down (buck) converter or a known step-up (boost) converter. The term "step-down converter" generally refers to a DC-to-DC converter where the output voltage is lower than the input voltage. The term "step-up converter" generally refers to a DC-to-DC converter where the output voltage is higher than the input voltage. In other embodiments, the switching regulator circuitry 202 may include a switching regulator configured as a known step-up/down (boost/buck) converter.

The controller circuitry 204 may include an application-specific integrated circuit (ASIC), microprocessor, or microcontroller. The controller circuitry 204 is configured to provide a pulse-width modulated (PWM) control output PWM Control to the switching regulator circuitry 202 in response to a current input Current Sense, which is representative of the output current Idrive of the switching regulator circuitry 202, and to a voltage input Voltage Sense, which is representative of the drive voltage Vdrive of the switching regulator circuitry 202. In some embodiments, for example, the controller circuitry 204 may include a Tiny85® microcontroller presently available from Atmel Corporation of San Jose, Calif. The PWM control output PWM Control of the controller circuitry 204 may cause the switching regulator circuitry 202 to establish a drive voltage Vdrive to drive the current regulator 106 in a manner to be described in greater detail below.

As shown, the switching regulator circuitry 202 may be coupled to the voltage supply 102 to receive the DC voltage output VDC, and may provide the drive voltage Vdrive to the current regulator 106. The controller circuitry 204 may be coupled to an output of the switching regulator circuitry 202 and may be configured to receive the voltage input Voltage Sense that is representative of the drive voltage Vdrive of the switching regulator circuitry 202, and the current input Current Sense that is representative of a drive current Idrive of the switching regulator circuitry 202. As shown in FIG. 2, the current input Current Sense to the controller circuitry 204 is coupled to the output of the switching regulator circuitry through resistors Rs1 and Rs2 to sense the voltage drop across a sense resistor Rsense, which is representative of the drive current Idrive. The voltage input Voltage Sense of the controller circuitry 204 is coupled between the resistor Rs1 and a positive output of the switching regulator circuitry 202 to provide a voltage at the voltage input Voltage Sense representative of the drive voltage Vdrive of the switching regulator circuitry 202.

The controller circuitry 204 may be configured to provide the PWM control output PWM Control to the switching regulator circuitry 202 in response to the drive current Idrive of the switching regulator circuitry 202. The PWM control output PWM Control may cause the switching regulator circuitry 202 to establish a drive voltage Vdrive that is different from the DC voltage output VDC of the voltage supply 102, but approximates a forward voltage drop Vd (described above with regards to FIG. 1) from an output of the auto-sensing switching regulator 104 through the light source 108 (e.g. across the current regulator 106 and the light source 108 as shown in FIGS. 1 and 2). The auto-sensing switching regulator 104 may thus provide a drive voltage Vdrive to the current regulator 106 that avoids significant dissipation of excess power in the current regulator 106 that would otherwise result from driving the current regulator 106 with a voltage that is significantly greater than the forward voltage drop Vd from the output of the auto-sensing switching regulator 104 through the light source 108.

In some embodiments, for example, the voltage supply 102 may provide a constant 24V DC voltage output VDC while the current regulator 106 provides a voltage drop of about 1.0V and the light source has a forward voltage drop at the driving current of 18.1V. In the absence of an auto-sensing switching regulator 104 according to embodiments described herein, such a system would exhibit a 24.5% conversion loss, i.e. approximately 4.9V (24V−(18.1V+1.0V)) would be dissipated by the current regulator 106 in the form of heat. A disparity between the DC voltage output VDC and the voltage drop Vd from the auto-sensing switching regulator 104 through the light source 108 lead to inefficiency. In a system including an auto-sensing switching regulator 104 according to embodiments described herein, however, the auto-sensing switching regulator 104 may convert the 24V DC voltage output VDC from the voltage supply 102 to an approximately 19.1V output (i.e., drive voltage Vdrive) (18.1V for the light source 108 itself and 1.0V to account for linear regulator voltage drop) at the input to the current regulator 106. Driving the current regulator 106 at 19.1V, as in this example, would lower the total losses from 24.5% (in a system without the auto-sensing switching regulator) to about 5.25%, which represents a 78% improvement.

In some embodiments, the controller circuitry 204 may act according to, for example but not limited to, programmed software instructions. In so doing, the controller circuitry 204 may control the switching regulator circuitry 202 to establish a drive voltage Vdrive that approximates the forward voltage drop Vd from the switching regulator circuitry 202 through the light source 108 and that is dynamically updated to account for changes or variations in the load presented by the light source 108 and/or the current regulator 106. Operation of such embodiments of an auto-sensing switching regulator 104 may be understood, for example, with reference to FIG. 2 in combination with FIG. 3, which is a simulated plot of voltage and current vs. time at the output of the auto-sensing switching regulator 104 of FIG. 2. A plot 302 represents the drive voltage Vdrive at a voltage output of the auto-sensing switching regulator 104 and a plot 304 represents the drive current Idrive at a current output of the auto-sensing switching regulator 104.

At start up, the PWM control output PWM Control of the controller circuitry 204 may cause the switching regulator circuitry 202 to ramp up the drive voltage Vdrive, as shown in section 306 of the plots 302 and 304, while sampling the voltage input Voltage Sense and the current input Current Sense, for example but not limited to at a predetermined time interval such as every 2 µs. The voltage input Voltage Sense to the controller circuitry 204 is representative of the drive voltage Vdrive, e.g. shown in plot 302, and the current input Current Sense to the controller circuitry 204 is representative of the drive current Idrive, e.g. shown in plot 304. The value at the voltage input Voltage Sense and at the current input Current Sense to the controller circuitry 204 for each time interval may be stored in the controller circuitry 204.

Figure 3:
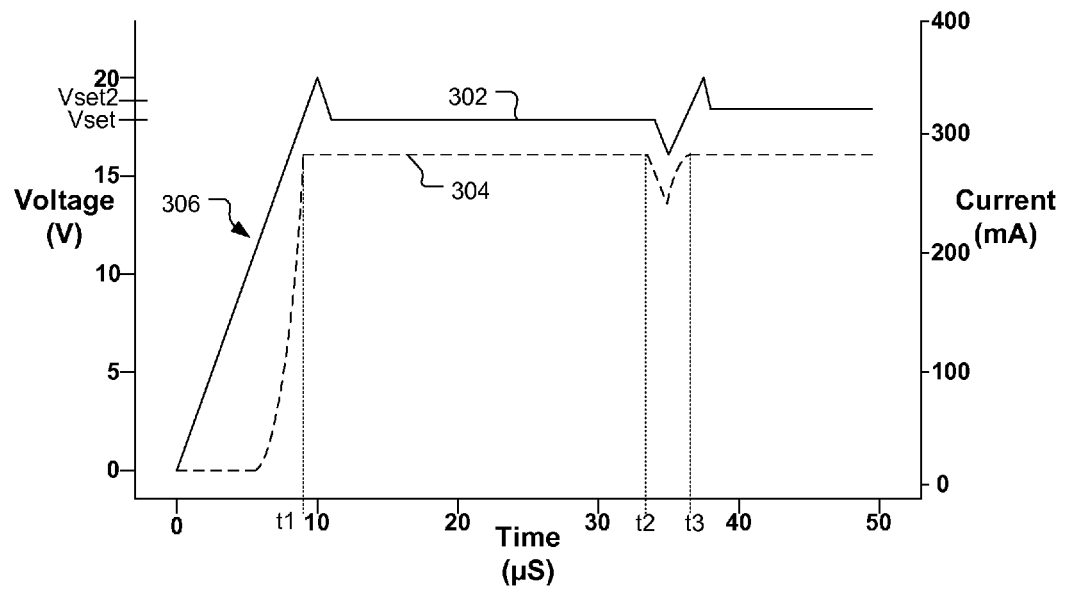
FIG. 3 includes plots of voltage and current vs. time illustrating performance of an auto-sensing switching regulator according to embodiments described herein.

An optimum value for the drive voltage Vdrive of the switching regulator circuitry 202 to drive the current regulator 106 may be the voltage value at which the current regulator 106 is saturated and does not draw increasing drive current Idrive from the switching regulator circuitry 202 with increasing drive voltage Vdrive from the switching regulator circuitry 202. When the current regulator 106 is saturated, any further increase in the drive voltage Vdrive of the switching regulator circuitry 202 is dissipated in ohmic losses in the current regulator 106, thereby generating heat. In FIG. 3, for example, the drive current Idrive stops increasing with increasing drive voltage Vdrive at time t1. The optimum value for the drive voltage Vdrive of the switching regulator circuitry 202 to drive the current regulator 106 may therefore be a voltage value Vset occurring at time t1.

With continued reference to FIGS. 2 and 3, the controller circuitry 204 may be configured to monitor saturation of the current regulator 106 to set the drive voltage Vdrive of the switching regulator circuitry 202 to a value Vset corresponding to the value at which the drive current Idrive of the switching regulator circuitry 202 increases at a reduced rate/slope, e.g. stops increasing, with increasing drive voltage Vdrive. In some embodiments, for example, as the sampled values taken at the voltage input Voltage Sense and the current input Current Sense are stored in the controller circuitry 204, the values taken at the current input Current Sense may be averaged and compared to a previous average. When the rate of increase of the averaged values taken at the current input Current Sense decrease by a pre-defined threshold amount with the value taken at the voltage input Voltage Sense increasing, the controller circuitry 204 may record the time, e.g. time t1, and store the value taken at the voltage input Voltage Sense that occurs at that time as an optimum Voltage Sense value. The controller circuitry 204 may then provide a PWM control output PWM Control configured to establish a drive voltage Vdrive of the switching regulator circuitry 202 at a value, e.g. Vset, corresponding to the stored optimum Voltage Sense value.

Those of ordinary skill in the art will recognize that setting the drive voltage Vdrive of the switching regulator circuitry 202 to the exact value at which the drive current Idrive stops increasing with increasing drive voltage Vdrive may result in an optimal setting of the drive voltage Vdrive. However, in some situations, it may be desirable to set the value of the drive voltage Vdrive to a value slightly above, for example but not limited to 10% or more above (or, in some embodiments, below), the optimal setting of the drive voltage Vdrive to ensure the switching regulator circuitry 202 drives the current regulator 106 to saturation. Setting the drive voltage Vdrive to a higher than optimal value results in some inefficiency, i.e. excess input voltage that is dissipated in the current regulator 106, which may be acceptable in one or more particular applications. Thus, in some embodiments, the controller circuitry 204 may provide a PWM control output PWM Control configured to set the drive voltage Vdrive to a value at which the drive current Idrive stops increasing with increasing drive voltage Vdrive. The value may be the same as the value of the drive voltage Vdrive at which the drive current Idrive stops increasing with increasing drive voltage Vdrive, or may be different from the value of the drive voltage Vdrive at which the drive current Idrive stops increasing with increasing drive voltage Vdrive, as long as the difference results in an inefficiency that is acceptable in the application.

Advantageously, the controller circuitry 204 may also be configured to monitor the current input Current Sense and the voltage input Voltage Sense at each start up of the system 100, e.g. each time the light source 108 is energized by the voltage supply 102, and also during operation of the light source 108 to ensure that the drive voltage Vdrive is set at a level corresponding to a value at which the drive current Idrive stops increasing with increasing drive voltage Vdrive. With continued reference to FIGS. 2 and 3, in some embodiments, after the controller circuitry 204 has set the drive voltage Vdrive to the value Vset, it may periodically check to ensure the value Vset is set to a value at which the drive current Idrive stops increasing with increasing drive voltage Vdrive. For example, at time t2 in FIG. 3, the controller circuitry 204 may provide a PWM control output PWM Control that decreases the drive voltage Vdrive from the Vset value and then ramps the drive voltage Vdrive back toward the Vset value while monitoring the current input Current Sense. When the rate of increase of the averaged values taken at the current input Current Sense decrease by a pre-defined threshold amount with increasing value taken at the voltage input Voltage Sense, the controller circuitry 204 may record the time, e.g. time t3, and store the value taken at the voltage input Voltage Sense occurring at that time as a new optimum Voltage Sense value. The controller circuitry 204 may then provide a PWM control output PWM Control configured to establish a drive voltage Vdrive of the switching regulator circuitry 202 at a value, e.g. Vset2, corresponding to the stored new optimum Voltage Sense value.

In the event there were changes in the load presented by the current regulator 106 and/or the light source 108 between the time t1, when the value Vset was originally established, and the time t3, when the value Vset2 was set, the value Vset2 would be different from the value Vset to ensure that the drive voltage Vdrive is set to a value at which the drive current Idrive stops increasing with increasing drive voltage Vdrive. Systems according to embodiments described herein may thus dynamically and continuously adjust the drive voltage Vdrive to a value that achieves a desired efficiency of the current regulator 106, even in the event of changes or variations in the load presented to the auto-sensing switching regulator 104, e.g. by the current regulator 106 and/or the light source 108. In addition, dynamic adjustment of the drive voltage Vdrive allows use of an auto-sensing switching regulator 104 with a variety of light source and/or current regulator configurations without requiring any change in the configuration of the auto-sensing switching regulator 104, or any threshold values within the controller circuitry 204.

Figure 4:
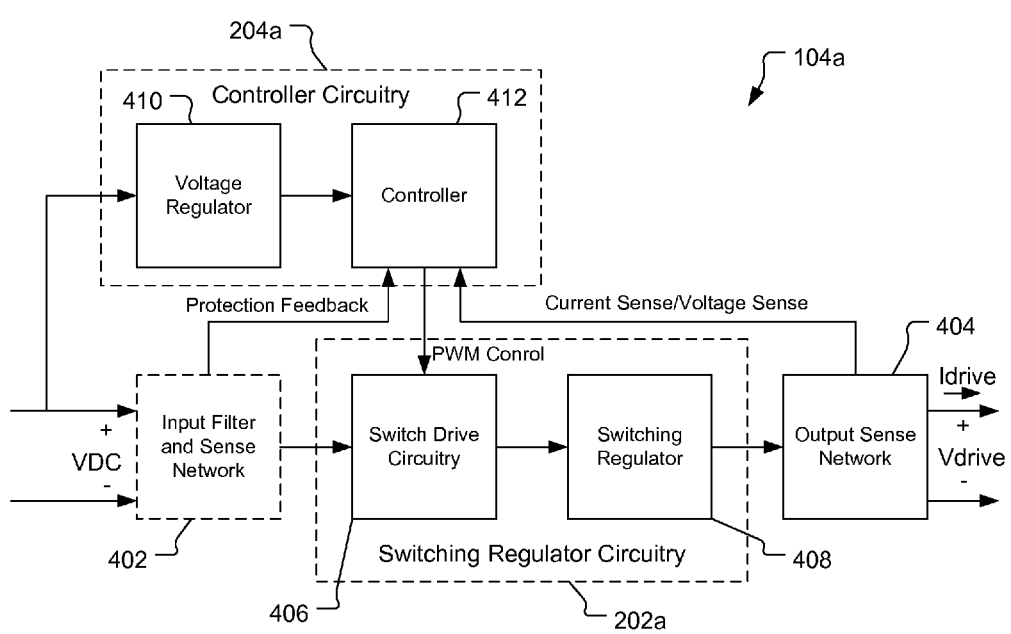
FIG. 4 is a block diagram of an auto-sensing switching regulator according to embodiments described herein.

FIG. 4 is a block diagram illustrating an auto-sensing switching regulator 104a according to embodiments described herein. The auto-sensing switching regulator 104a includes controller circuitry 204a, switching regulator circuitry 202a, an optional input filter and sense network 402, and an output sense network 404. As shown, the DC voltage output VDC from the voltage supply 102 (shown and described in regards to FIGS. 1 and 2) may be coupled to the switching regulator circuitry 202a through the optional input filter and sense network 402. The optional input filter and sense network 402 may be configured to buffer the DC voltage output VDC to facilitate driving the switching regulator circuitry 202a, and may also include a sense network to provide an input Protection Feedback to the controller circuitry 204a. In the event that input current and/or input voltage to the switching regulator circuitry 202a exceeds predetermined values, the controller circuitry 204a may provide a PWM control output PWM Control to the switching circuitry 202a in response to the input Protection Feedback to prevent operation of the switching regulator circuitry 202a and thereby protect its components from excess voltage or current appearing at its input.

The switching regulator circuitry 202a may include switch drive circuitry 406 and a switching regulator 408. The switching regulator 408 may be any known switching regulator, such as but not limited to a buck converter, boost converter, buck/boost converter, flyback converter, etc., depending on the DC voltage output VDC and the voltage requirements of the current regulator 106 (see FIGS. 1-2) and the light source 108 (see FIGS. 1-2). The switch drive circuitry 406 may provide an interface between the controller circuitry 204a and the switching regulator 408 for enabling the PWM control output PWM Control of the controller circuitry 204a to drive the switching regulator 408. The switching regulator 408 may provide a drive voltage Vdrive through the output sense network 404. The output sense network 404 may provide Current Sense/Voltage Sense feedback to the controller circuitry 204a.

In FIG. 4, the controller circuitry 204a includes a voltage regulator 410 and a controller 412. As discussed above, the controller 412 may be a known controller configured to receive the Current Sense/Voltage Sense feedback and provide a PWM control signal PWM Control in response thereto, to cause the switching regulator 408 to establish the drive voltage Vdrive at a value at which the drive current Idrive stops increasing with increasing drive voltage Vdrive. The voltage regulator 410 may be a known voltage regulator configuration to receive the DC voltage output VDC and to perform DC-DC conversion to provide a supply voltage to operate the controller 412.

Figure 5A:
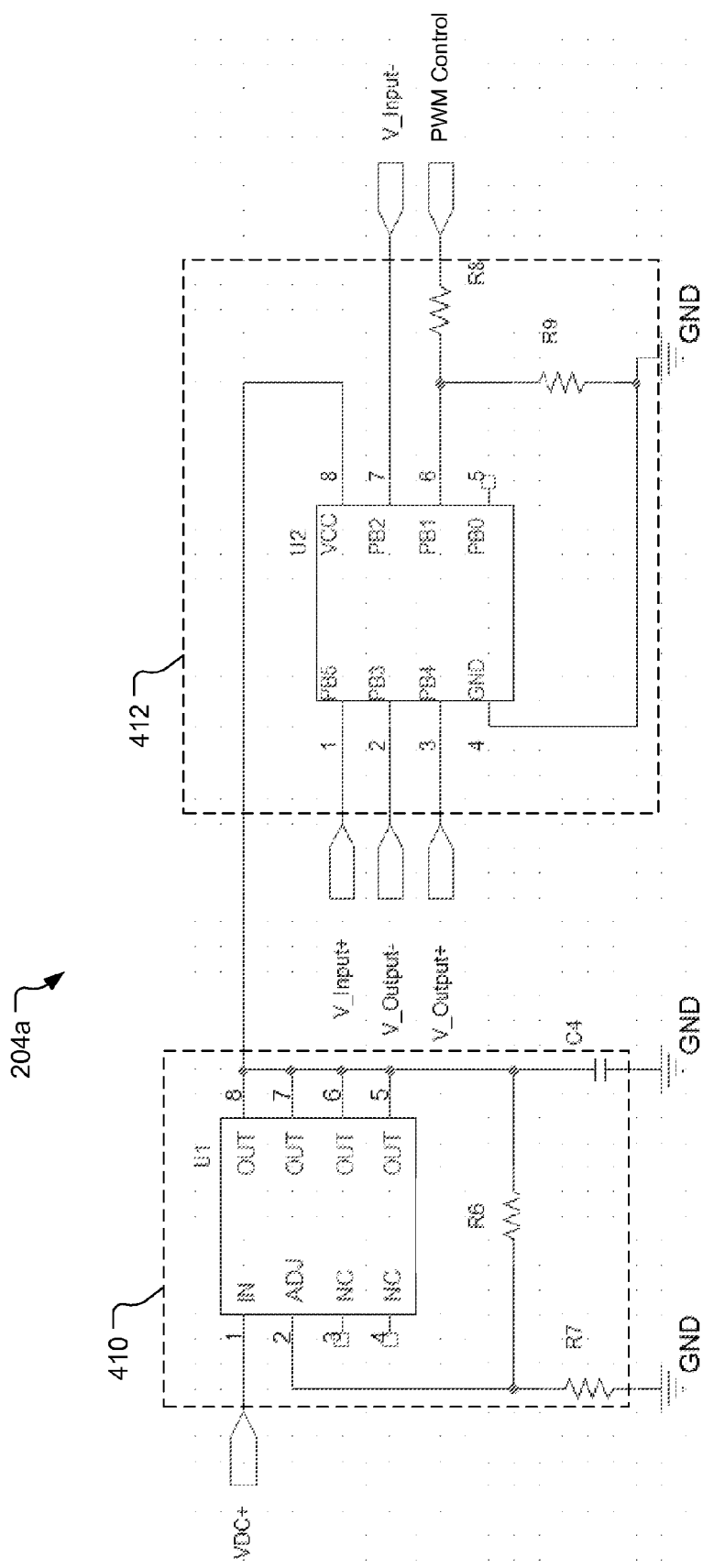
FIGS. 5A and 5B are schematic diagrams illustrating embodiments of the auto-sensing switching regulator shown in FIG. 4.
Figure 5B:
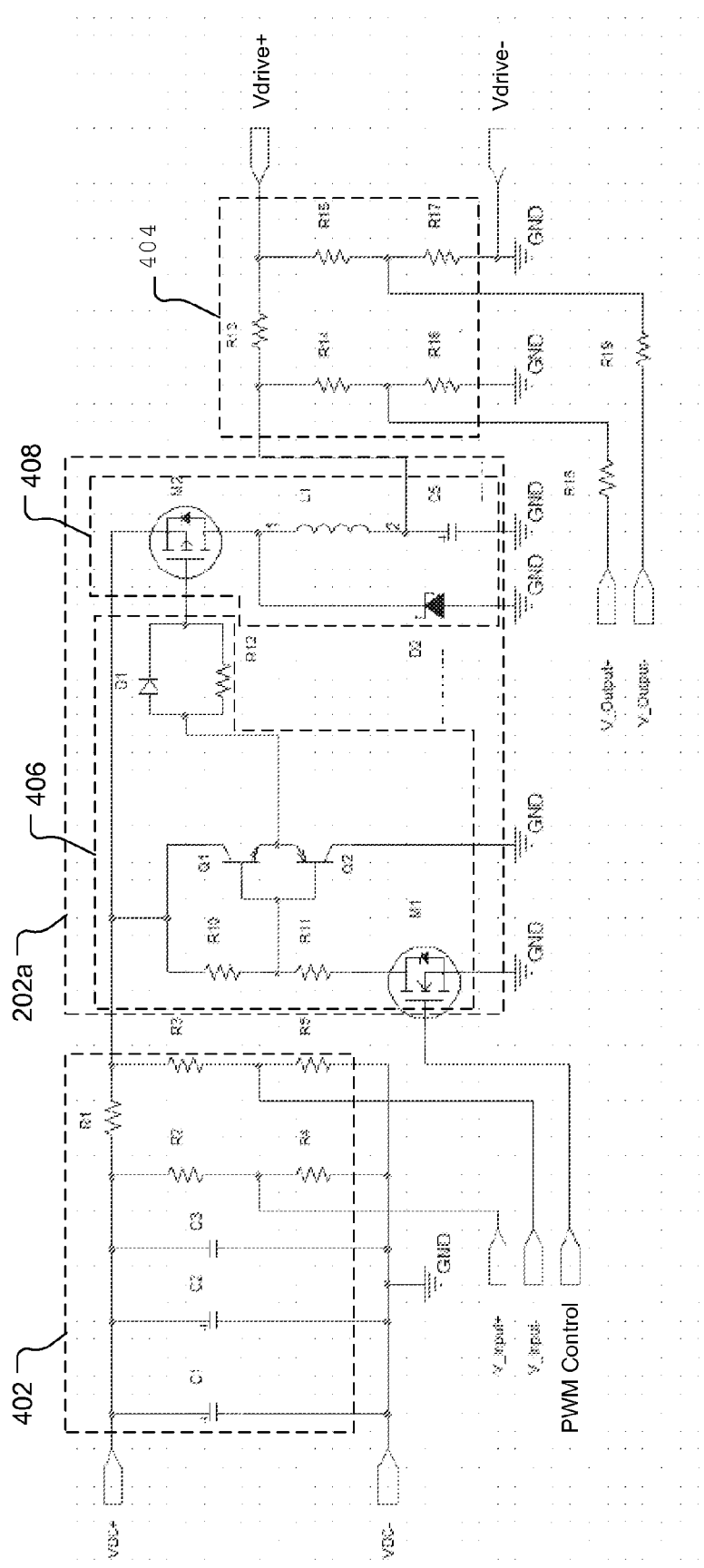

FIGS. 5A and 5B are schematic diagrams illustrating embodiments of the auto-sensing switching regulator 104a circuitry of FIG. 4. Those of ordinary skill in the art will recognize that the functionality of the circuitry illustrated in FIG. 4 may be implemented in a variety of ways using discrete and/or integrated circuits. It is to be understood, therefore, that the schematic diagrams of FIGS. 5A and 5B are provided only by way of illustration and are not intended to be limiting.

FIG. 5A schematically illustrates controller circuitry 204a including a known voltage regulator 410 and a known controller 412. In a known manner, the voltage regulator 410 is configured to receive the DC output voltage VDC and to provide a supply voltage to the VCC input of the controller 412 that is established by selection of the values of resistors R6 and R7. The controller 412 may receive positive V_Input+ and negative V_Input− input protection voltages from an input filter and sense network 402 (shown in FIG. 5B). The controller 412 may also receive positive V_Output+ and negative V_Output− output voltages from the output sense network 404, from which the Current Sense/Voltage Sense feedback may be derived. As described above, the controller 412 may provide a PWM control output PWM Control to the switching regulator circuitry 202a (shown in FIG. 5B).

FIG. 5B schematically illustrates an optional input filter and sense network 402, switching regulator circuitry 202a, and an output sense network 404. As shown, the input filter and sense network 402 includes a capacitor bank formed by parallel connection of capacitors C1, C2, and C3, a voltage and current sensing resistor R1, and a divider network formed by resistors R2, R3, R4, and R5. The DC output voltage VDC is provided across the capacitor bank to charge the capacitors C1, C2, and C3. The capacitors C1, C2, and C3 are discharged through the voltage and current sensing resistor R1 to drive the switching regulator circuitry 202a. The positive V_Inptut+ and negative V_Input− input protection voltages are taken between the resistors R2 and R4 and R3 and R5, respectively, and are provided to the controller 412 as shown in FIG. 5A, as Protection Feedback signals (shown in FIG. 4).

The switch drive circuitry 406 includes a FET M1, switches Q1 and Q2, resistors R10, R11, and R12, and diode D1. The resistors R10 and R11 and the FET M1 bias the cascaded arrangement of the switches Q1 and Q2. The gate of the FET M1 is coupled to the PWM control output PWM Control of the controller 412, which turns the FET M1 "on" (conducting) and "off" (not conducting). When the FET M1 is "on", the voltage at the node between emitters of the switches Q1 and Q2 establishes a lower voltage potential to dissipate gate charge through the resistor R12 and turn a FET M2 "on". When the FET M1 is "off", gate voltage at the FET M2 return to near VDC+ levels through the diode D1, thereby turning the FET M2 "off".

In FIG. 5B, the switching regulator 408 is configured as a buck converter including the FET M2, a diode D2, an inductor L1, and a capacitor C5. Operation of a buck converter configuration is well-known. In general, when the FET M2 is "on", energy is stored in the inductor L1. The inductor L1 charges the capacitor C5 to a value limited by the diode D2.

The voltage across the capacitor C5 establishes the output voltage of the switching regulator 408, which is the voltage drive Vdrive. When the FET M2 is "off", the capacitor C5 discharges through a sense resistor R13 to drive the current regulator 106 (shown in FIGS. 1-2) via the drive voltage Vdrive.

The output sense network 404 includes the sense resistor R13 and a divider network formed by resistors R14, R15, R16, R17, R18 and R19. The positive V_Output+ and negative V_Output− output voltages are taken between the resistors R14 and R16 and R15 and R17, respectively, and are provided to the controller 412 as shown in FIG. 5A. The Voltage Sense/Current Sense feedback to the controller 412 are derived from V_Outout+ and V_Output− output voltages and are used by the controller 412, as described above, to provide a PWM control output PWM Control, to establish a desired drive voltage Vdrive for the switching regulator 408.

Table 1 below identifies one example of circuit components useful in configuring the embodiment illustrated in FIGS. 5A and 5B for operation with a 24V DC input VDC (resistor values in ohms):

TABLE 1

| Component | Descriptor/Value |
| --- | --- |
| C1 | 220u |
| C2 | 10u |
| C3 | 100n |
| C4 | 1u |
| C5 | 50u |
| D1 | 1N4001 |
| D2 | STPS1045B |
| L1 | 10uH |
| M1 | 2N7002 |
| M2 | FQD11P06 |
| Q1 | PMMT491A |
| Q2 | PMMT591A |
| R1 | 0.07 |
| R2 | 200K |
| R3 | 200K |
| R4 | 10K |
| R5 | 10K |
| R6 | 220 |
| R7 | 360 |
| R8 | 100 |
| R9 | 10K |
| R10 | 6.8K |
| R11 | 3.3K |
| R12 | 10 |
| R13 | 0.07 |
| R14 | 200K |
| R15 | 200K |
| R16 | 10K |
| R17 | 10K |
| R18 | 4.7K |
| R19 | 4.7K |
| U1 | LM317LM |
| U2 | Atmel Tiny 85 |

Figure 6:
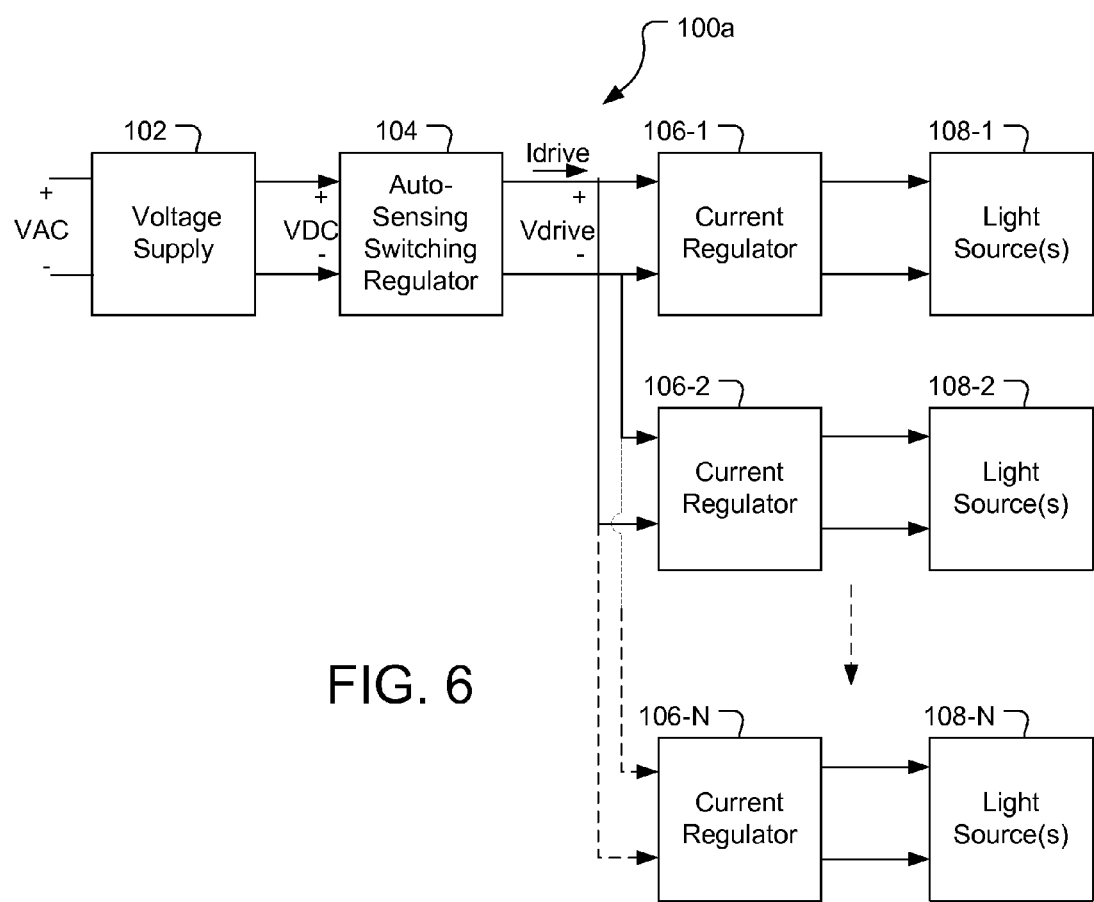
FIG. 6 is a block diagram of a system including multiple light sources according to embodiments described herein.

Although the embodiments illustrated in FIGS. 1-2 depict an auto-sensing switching 104 regulator driving a single current regulator 106 coupled in series with the light source(s) 108, embodiments according to the invention may be configured to drive any number of current regulator 106 and light source(s) 108 combinations with high efficiency. FIG. 6, for example, illustrates a system 100a including a voltage supply 102, an auto-sensing switching regulator 104, and a plurality of current regulators 106-1, 106-2 . . . 106-N coupled to an output of the auto-sensing switching regulator 104. Each of the current regulators 106-1, 106-2 . . . 106-N is coupled in series with an associated light source(s) 108-1, 108-2 . . . 108-N. When all of the current regulators 106-1, 106-2 . . . 106-N are saturated, increasing drive voltage Vdrive from the auto-sensing switching regulator 104 does not produce a corresponding increase in the drive current Idrive of the auto-sensing switching regulator 104. As described above in connection with FIGS. 2 and 3, the auto-sensing switching regulator 104 may set the drive voltage Vdrive to a value at which the drive current Idrive to the current regulators 106-1, 106-2 . . . 106-N stops increasing with increasing drive voltage Vdrive.

Figure 7:
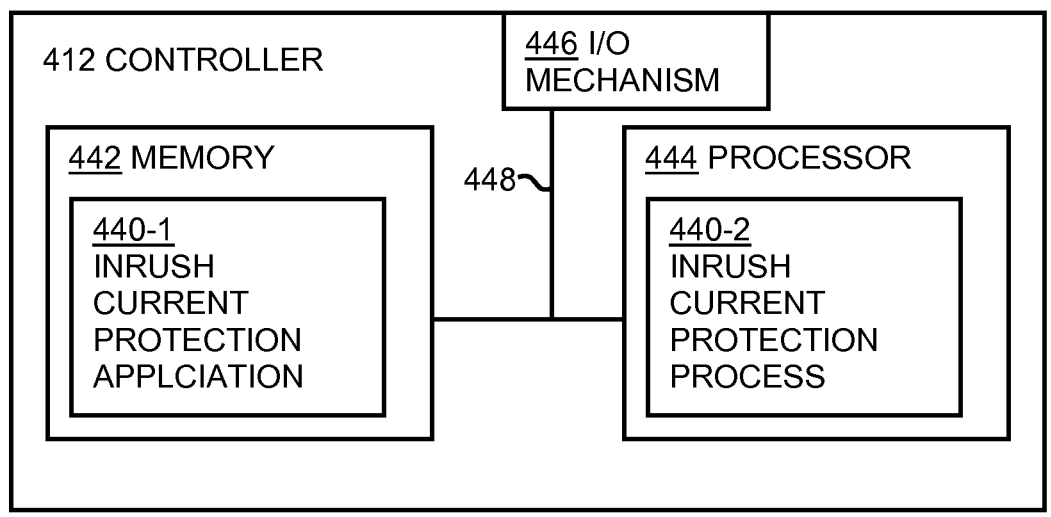
FIG. 7 is a high-level block diagram of a controller, such as found in an auto-sensing switching regulator, according to embodiments described herein.

Embodiments of the methods described herein may be implemented using a controller, e.g. the controller 412 shown in FIG. 4 and in greater detail in FIG. 7, and/or other programmable device. To that end, the methods described herein may be implemented on a tangible computer readable medium having instructions stored thereon that, when executed by one or more processors, perform the methods. Thus, for example, the controller 412 as shown in FIG. 7 illustrates an example architecture of that executes, runs, interprets, operates or otherwise performs a controller application 440-1 and a controller process 440-2 suitable for use in explaining example configurations disclosed herein. As shown in this example, the controller 412 includes a memory 442, a processor 444, an input/output mechanism 446, and an interconnection mechanism 448. The input/output mechanism 446 is capable of both receiving signals (input) from other components and transmitting signals (output) to other components of the auto-sensing switching regulator. The interconnection mechanism 448, which may be but is not limited to a data bus or other circuitry, couples the memory 442, the processor 444, and the input/output mechanism 446, allowing communication therebetween. In some embodiments, the controller 412 may include a separate communications interface (not shown in FIG. 7), that allows the controller 412 to communicate with other devices (e.g., other controllers within the auto-sensing switching regulator 104, controllers external to the auto-sensing switching regulator 104, etc). In some embodiments, the input/output mechanism 446 may include such a communications interface.

The memory 442 is any type of storage medium that is capable of being read by the processor 444, and in this example is encoded with a controller application 440-1 that includes a controller process 440-2. The controller application 440-1 may be embodied as software code such as data and/or logic instructions (e.g., code stored in the memory 442 or on another readable storage medium) that supports processing functionality according to different embodiments described herein. During operation of the controller 412, the processor 444 accesses the memory 442 via the interconnection mechanism 448 in order to launch, run, execute, interpret or otherwise perform the logic instructions of the controller application 440-1. Execution of the controller application 440-1 in this manner produces processing functionality in a controller process 440-2. In other words, the controller process 440-2 represents one or more portions or runtime instances of the controller application 440-1 performing or executing within or upon the processor 444 in the controller 412 at runtime.

It is noted that example configurations disclosed herein include the controller application 440-1 itself including the controller process 440-2 (i.e., in the form of un-executed or non-performing logic instructions and/or data). The controller application 440-1 may be stored on a readable storage medium within the controller 412 or a readable storage medium external to the controller 412, such as but not limited to a floppy disk, hard disk, electronic, magnetic, optical or other readable storage medium. The controller application 440-1 may also be stored in a memory system, whether internal or external to the controller 412, such as but not limited to in firmware, read only memory (ROM), or as executable code in, for example, Random Access Memory (RAM). In addition to these embodiments, it should also be noted that other embodiments herein include the execution of the controller application 440-1 in the processor 444 of the controller 412 as the controller process 440-2. Those skilled in the art will understand that the controller 412 may include other processes and/or software and hardware components which are not shown or otherwise described herein.

A number of flowcharts of methods according to embodiments described herein are illustrated in FIGS. 8-9. The rectangular elements are herein denoted "processing blocks" and may, in some embodiments, represent software instructions or groups of instructions. Alternatively, the processing blocks may, in some embodiments, represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. More specifically, FIGS. 8-9 illustrate methods of improving the efficiency of a system including a current regulator to drive a light source according to embodiments described herein.

As shown in FIGS. 8-9, the controller application 440-1 executing on the processor 444 of the controller 412 as the controller process 440-2 monitors a current output to a current regulator (such as the current regulator 106 shown in FIGS. 1-2) while increasing an output voltage (i.e., the drive voltage Vdrive) to the current regulator, step 801/901. The controller process 440-2 then sets the output voltage (i.e., the drive voltage Vdrive) to a set value corresponding to a value at which the current output (i.e., the drive current Idrive) stops increasing with an increase in the output voltage (i.e., the drive voltage Vdrive), step 802/902, as explained throughout.

In some embodiments, as shown in FIG. 9, the controller process 440-2 reduces the output voltage (i.e., the drive voltage Vdrive) from the set value and then increases the output voltage (i.e., the drive voltage Vdrive) while monitoring the current output (i.e., the drive current Idrive), step 903, and sets the output voltage (i.e., the drive voltage Vdrive) at a second set value corresponding to a second value at which the current output (i.e., the drive current Idrive) stops increasing with an increase in the output voltage (i.e., the drive voltage Vdrive), step 904, as described throughout. Thus, as described in further detail above, in some embodiments, the set value is the same as the value at which the current output (i.e., the drive current Idrive) stops increasing with an increase in the output voltage (i.e., the drive voltage Vdrive), step 905. Alternatively, or additionally, in some embodiments, the set value is a different value than the value at which the current output (i.e., the drive current Idrive) stops increasing with an increase in the output voltage (i.e., the drive voltage Vdrive), step 906. Alternatively, or additionally, in some embodiments, the set value is approximately equal to a forward voltage drop (i.e., Vd) from an output of the auto-sensing switching regulator through a light source, step 907. As described in detail above in regards to FIG. 1, the forward voltage drop from an output of the auto-sensing switching regulator 104 through the light source 108 may thus be across the current regulator 106 and the light source 108, and in some embodiments, may include the auto-sensing switching regulator 104, and/or components thereof.

As used in any embodiment herein, "circuitry" may comprise, for example, singly or in any combination, hardwired circuitry, programmable circuitry, state machine circuitry, and/or firmware that stores instructions executed by programmable circuitry. The voltage supply, auto-sensing switching regulator and/or the current regulator shown in FIGS. 1, 2 and 4 may collectively or individually comprise one or more integrated circuits. An "integrated circuit" may be a digital, analog or mixed-signal semiconductor device and/or microelectronic device, such as, for example, but not limited to, a semiconductor integrated circuit chip.

Those of ordinary skill in the art will recognize that an auto-sensing switching regulator according to embodiments may be provided after one or more power supply switching regulator stages. Also, in some embodiments, a power-supply integrated circuit may be configured to include an auto-sensing switching regulator according to embodiments, wherein the switching regulator portion of the auto-sensing switching regulator is the only switching regulator in the power supply integrated circuit. As indicated in FIG. 1, for example, a power supply integrated circuit 103 may include a power supply 102 including rectifier circuitry to provide an unregulated rectified AC signal that is provided to the input of an auto-sensing switching regulator 104, e.g. as VDC. The output of such a power supply integrated circuit 103 may be coupled to a current regulator 106 to drive the current regulator 106 and the light source(s) 108 as described herein.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, optical drive, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone(s) or smart cellphone(s), laptop(s), handheld computer(s), or another device(s) capable of being integrated with a processor (s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system to drive a light source, the system comprising:
    a current regulator configured to provide a constant current output to the light source; and
    an auto-sensing switching regulator coupled to the current regulator, and configured to receive an input voltage from a voltage supply and provide an output voltage to the current regulator, the auto-sensing switching regulator comprising:
        a switching regulator; and
        a controller coupled to the switching regulator, the controller being configured to provide a control signal to the switching regulator to increase the output voltage while receiving a current sense signal representative of a current output of the switching regulator, the controller being configured to provide the control signal in response to the current sense signal to set the output voltage at a set value corresponding to a value at which the current output stops increasing with an increase in the output voltage.

2. The system according to claim 1, wherein the controller is further configured to provide the control signal to reduce the output voltage from the set value and then increase the output voltage while receiving the signal representative of the current output, the controller being configured to provide the control signal to set the output voltage at a second set value corresponding to a second value at which the current output stops increasing with an increase in the output voltage.

3. The system according to claim 1, wherein the set value is the same as the value at which the current output stops increasing with an increase in the output voltage.

4. The system according to claim 1, wherein the set value is a different value than the value at which the current output stops increasing with an increase in the output voltage.

5. The system according to claim 1, wherein the set value is approximately equal to a forward voltage drop from an output of the auto-sensing switching regulator through the light source.

6. The system according to claim 1, wherein the controller is configured to receive a voltage sense signal representative of the voltage output, and wherein the controller is configured to provide the control signal to set the output voltage at the set value in response to the current sense signal and the voltage sense signal.

7. The system according to claim 6, wherein the controller is configured to store a value of the voltage sense signal corresponding to a value at which the current sense signal stops increasing with increasing values of the voltage sense signal, and wherein the set value is a voltage value corresponding to the stored value of the voltage sense signal.

8. The system according to claim 1, wherein the light source comprises at least one solid state light source.

9. An auto-sensing switching regulator to receive a voltage input from a voltage supply and to provide an output voltage to a current regulator configured to provide a constant current output to a light source, the auto-sensing switching regulator comprising:

a switching regulator; and a controller coupled to the switching regulator, the controller being configured to provide a control signal to the switching regulator to increase the output voltage while receiving a current sense signal representative of a current output of the switching regulator, the controller being configured to provide the control signal in response to the current sense signal to set the output voltage at a set value corresponding to a value at which the current output stops increasing with an increase in the output voltage.

10. The auto-sensing switching regulator according to claim 9, wherein the controller is further configured to provide the control signal to reduce the output voltage from the set value and then increase the output voltage while receiving the signal representative of the current output, the controller being configured to provide the control signal to set the output voltage at a second set value corresponding to a second value at which the current output stops increasing with an increase in the output voltage.

11. The auto-sensing switching regulator according to claim 9, wherein the set value is the same as the value at which the current output stops increasing with an increase in the output voltage.

12. The auto-sensing switching regulator according to claim 9, wherein the set value is a different value than the value at which the current output stops increasing with an increase in the output voltage.

13. The auto-sensing switching regulator according to claim 9, wherein the set value is approximately equal to a forward voltage drop from an output of the auto-sensing switching regulator through the light source.

14. The auto-sensing switching regulator according to claim 9, wherein the controller is configured to receive a voltage sense signal representative of the voltage output, and wherein the controller is configured to provide the control signal to set the output voltage at the set value in response to the current sense signal and the voltage sense signal.

15. The auto-sensing switching regulator according to claim 14, wherein the controller is configured to store a value of the voltage sense signal corresponding to a value at which the current sense signal stops increasing with increasing values of the voltage sense signal, and wherein the set value is a voltage value corresponding to the stored value of the voltage sense signal.

16. A method of improving efficiency of a system including a current regulator to drive a light source, the method comprising:

monitoring a current output to the current regulator while increasing an output voltage to the current regulator; and setting the output voltage at a set value corresponding to a value at which the current output stops increasing with an increase in the output voltage.

17. The method according to claim 16, the method further comprising:

reducing the output voltage from the set value and then increasing the output voltage while monitoring the current output; and setting the output voltage at a second set value corresponding to a second value at which the current output stops increasing with an increase in the output voltage.

18. The method according to claim 16, wherein the set value is the same as the value at which the current output stops increasing with an increase in the output voltage.

19. The method according to claim 16, wherein the set value is a different value than the value at which the current output stops increasing with an increase in the output voltage.

20. The method according to claim 16, wherein the set value is approximately equal to a forward voltage drop from an output of the auto-sensing switching regulator through the light source.

* * * * *